United States Patent
Eifert et al.

(10) Patent No.: US 10,087,852 B2
(45) Date of Patent: Oct. 2, 2018

(54) FUEL FLOW SPLITTER AND GAS TURBINE FUEL SYSTEM HEALTH MONITORING

(71) Applicants: Rolls-Royce North American Technologies, Inc., Indianapolis, IN (US); Rolls-Royce Corporation, Indianapolis, IN (US)

(72) Inventors: Andrew J. Eifert, Indianapolis, IN (US); Oran Watts, Indianapolis, IN (US); Jack D. Petty, Sr., Indianapolis, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 761 days.

(21) Appl. No.: 14/577,064

(22) Filed: Dec. 19, 2014

(65) Prior Publication Data

US 2015/0192074 A1    Jul. 9, 2015

Related U.S. Application Data

(60) Provisional application No. 61/921,898, filed on Dec. 30, 2013.

(51) Int. Cl.
*F02C 9/28* (2006.01)
*F02C 7/232* (2006.01)
(Continued)

(52) U.S. Cl.
CPC .............. *F02C 9/28* (2013.01); *F02C 7/228* (2013.01); *F02C 7/232* (2013.01); *F02C 7/236* (2013.01); *F02C 9/26* (2013.01)

(58) Field of Classification Search
CPC ...... F02C 9/26; F02C 9/28; F02C 7/22; F02C 7/228; F02C 7/232; F02C 7/236
(Continued)

(56) References Cited

U.S. PATENT DOCUMENTS 2,291,578 A    7/1942    Johnson
2,566,734 A    9/1951    Lawrence et al.
(Continued)

FOREIGN PATENT DOCUMENTS

EP    1288467 A1    3/2003
EP    2514948 A2    10/2012

OTHER PUBLICATIONS

European Search Report dated May 21, 2015.

*Primary Examiner* — Thai Ba Trieu
*Assistant Examiner* — Loren Edwards
(74) *Attorney, Agent, or Firm* — Fishman Stewart PLLC

(57) ABSTRACT

A gas turbine health monitoring fuel system including a fuel splitter, a first and second fuel nozzle, a first and second fuel pump, and a common drive coupled to the first and second fuel pumps. The first and second fuel pumps are downstream from the fuel splitter. The first fuel nozzle is fluidly coupled to the first fuel pump by a first fuel stream. The second fuel nozzle is fluidly coupled to the second fuel pump by a second fuel stream. The common drive is configured to drive the first and second fuel pumps at a same speed. The controller system is configured to determine a first fuel pressure in the first fuel stream, determine a second fuel pressure in the second fuel stream, and identify a difference between the first and second fuel pressures.

17 Claims, 5 Drawing Sheets

(51) Int. Cl.
  *F02C 7/236* (2006.01)
  *F02C 7/228* (2006.01)
  *F02C 9/26* (2006.01)

(58) Field of Classification Search
  USPC .................................. 60/776, 734, 746, 747
  See application file for complete search history.

(56) References Cited

U.S. PATENT DOCUMENTS

| | | | |
|---|---|---|---|
| 2,599,680 A * | 6/1952 | Weeks | F02C 7/236 |
| | | | 137/118.06 |
| 2,795,106 A | 6/1957 | Martin | |
| 2,806,354 A | 9/1957 | Cook | |
| 2,936,028 A | 5/1960 | Gatzemeyer et al. | |
| 3,316,712 A | 5/1967 | Tyler | |
| 3,738,104 A | 6/1973 | Rosa | |
| 4,531,535 A | 7/1985 | Kiernan et al. | |
| 5,116,362 A * | 5/1992 | Arline | F02C 7/236 |
| | | | 417/203 |
| 5,390,498 A | 2/1995 | Sulkin | |
| 5,412,949 A | 5/1995 | Joland | |
| 6,079,198 A | 6/2000 | Prowse et al. | |
| 6,209,310 B1 * | 4/2001 | Kuenzi | F02C 3/30 |
| | | | 60/39.281 |
| 6,637,184 B2 | 10/2003 | Freeman | |
| 6,655,152 B2 | 12/2003 | Griffiths et al. | |
| 6,880,325 B2 * | 4/2005 | Aoyama | F02C 7/228 |
| | | | 60/39.37 |
| 7,216,487 B2 | 5/2007 | Parsons | |
| 7,497,083 B2 | 3/2009 | Yates et al. | |
| 7,845,177 B2 | 12/2010 | Parsons | |
| 8,166,765 B2 | 5/2012 | Baker et al. | |
| 8,666,632 B2 * | 3/2014 | Zebrowski | F02C 7/228 |
| | | | 60/745 |
| 9,617,960 B2 * | 4/2017 | Saito | F02M 51/00 |
| 2004/0060301 A1 * | 4/2004 | Chen | F23N 1/002 |
| | | | 60/776 |
| 2013/0091857 A1 | 4/2013 | Thornton et al. | |

\* cited by examiner

FUEL FLOW SPLITTER AND GAS TURBINE FUEL SYSTEM HEALTH MONITORING

CROSS-REFERENCE TO RELATED APPLICATIONS

This application claims priority to U.S. Provisional Patent Application No. 61/921,898, filed Dec. 30, 2013, the contents of which are hereby incorporated in their entirety.

FIELD OF TECHNOLOGY

An improved health management approach for identifying a faulty fuel nozzle in a gas turbine engine is disclosed. The improvements are applicable to engine systems used to power marine, land, air, and underwater applications, as examples.

BACKGROUND

Fuel systems for gas turbine engines often include a pressure source such as a fuel pump or other fuel control module that provides fuel to a plurality of fuel nozzles. Due to the fuel being supplied by a common pressure source, the fuel pressure supplied to each of the nozzles is generally the same. If all the nozzles had the same passage size, then the same amount of fuel would be injected into the engine from each fuel nozzle since they each provide with the same fuel pressure. To maximize the chances that each fuel nozzle has the same passage size, the fuel nozzles are often purchased or manufactured as matched sets. Despite employing matched sets, there is often variability among the nozzles. As such, fuel nozzles supplying the same engine may be providing different flow rates to the engine. It is noted that variance in nozzle flows rates can also stem from damage or simple wear, not just variability from manufacturing.

Variability among fuel nozzle flow rates can cause problems. For example, a higher flow rate from a fuel nozzle means that the downstream gas stream will be hotter than a downstream gas stream from a fuel nozzle outputting at a lower fuel rate. If hardware downstream from a hot gas stream (e.g., combustion liner or turbine vanes) is not designed to accommodate the heat from this hot gas stream, failure can occur. As such, systems are often designed to assume that hardware downstream from each fuel nozzle is downstream from the hottest gas stream. In turn, such systems supply a cooling flow to components downstream from each fuel nozzle assuming that each component is battling the hottest gas stream predicted. The outcome is that, generally, components downstream from fuel nozzles working properly are being provided with more cooling flow than needed. This overloading of cooling flow can decrease engine performance and/or engine life.

In practice, it can be difficult to determine which fuel nozzle is supplying fuel at a rate different than expected. Often, a sensor monitors the pressure upstream from the fuel nozzles to determine if there is a variance in the output in a fuel nozzle. If a fuel nozzle is supplying fuel at a rate greater than expected, the fuel pressure will likely drop. On the other hand, if a fuel nozzle is supplying fuel at a rate lower than expected, the fuel pressure will likely rise. However, typically, this technique does not tell you what fuel nozzle is faulty. That is, since the same pressure source (e.g., fuel pump) supplies all of the fuel nozzles, a change in the fuel pressure upstream from the fuel nozzles can tell you that at least one fuel nozzle is faulty, but not what fuel nozzle(s) is faulty. As such, often all the fuel nozzles are replaced when the upstream pressure is not what is expected since identification of the particular faulty fuel nozzle is unlikely without bench testing.

Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least two generator circuits, one coupled to a high pressure portion of a gas turbine engine and the other coupled to a low pressure portion of the gas turbine engine.

Figure 1:
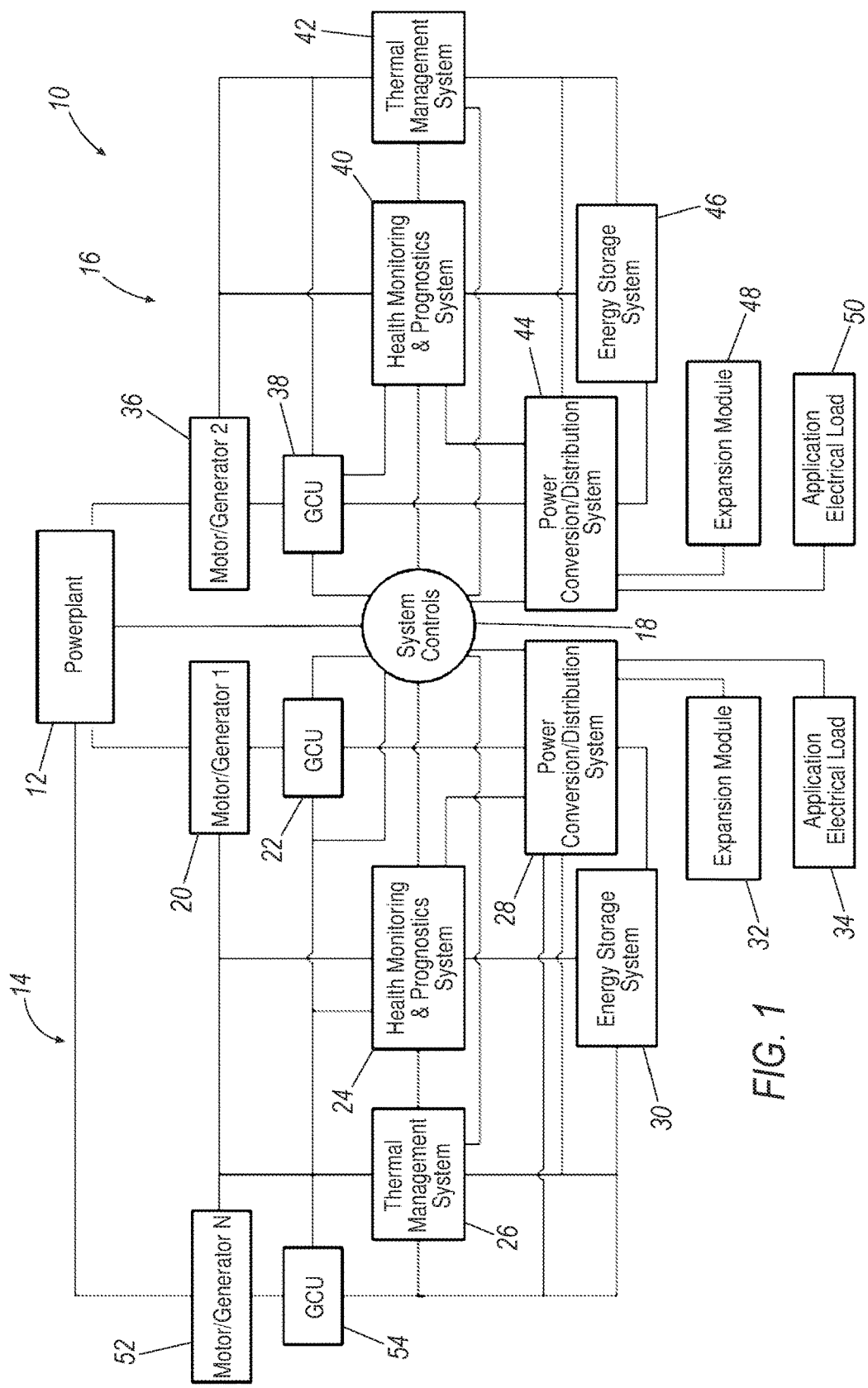
FIG. 1 is a schematic illustration of an electrical system coupled to a gas turbine engine, according to one example.

FIG. 1 illustrates an electrical system 10 in which a power plant or engine 12, such as a gas turbine engine, provides electrical power to a first power circuit 14 and a second power circuit 16. A system controller 18 is coupled to engine 12 and also to first and second circuits 14, 16. First power circuit 14 includes a motor/generator 20 and a General Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 monitors the health of system components, and is used to estimate component life based on sensor feedback received from components within engine 12. Referring back to FIG. 1, thermal management system 26 includes pumps, expansion valves, and the like, as well as a controller, to provide coolant for the purposes of climate control, and other system operations. Power conversion/distribution system 28 receives electrical power from motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to motor/generator 20 to provide starting power to engine 12 during startup. Expansion module 32 and application electrical load 34 represent additional electrical components that receive power from power conversion/distribution system 28.

Second power circuit 16 similarly includes a motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional motor/generators 52 and corresponding GCUs 54 as well, which may be coupled to a gas turbine engine as will be further described. Thus, the system 10 is modular and flexible in that it may be expanded to include a number N of motor/generators based on contemplated operating conditions.

Figure 2:
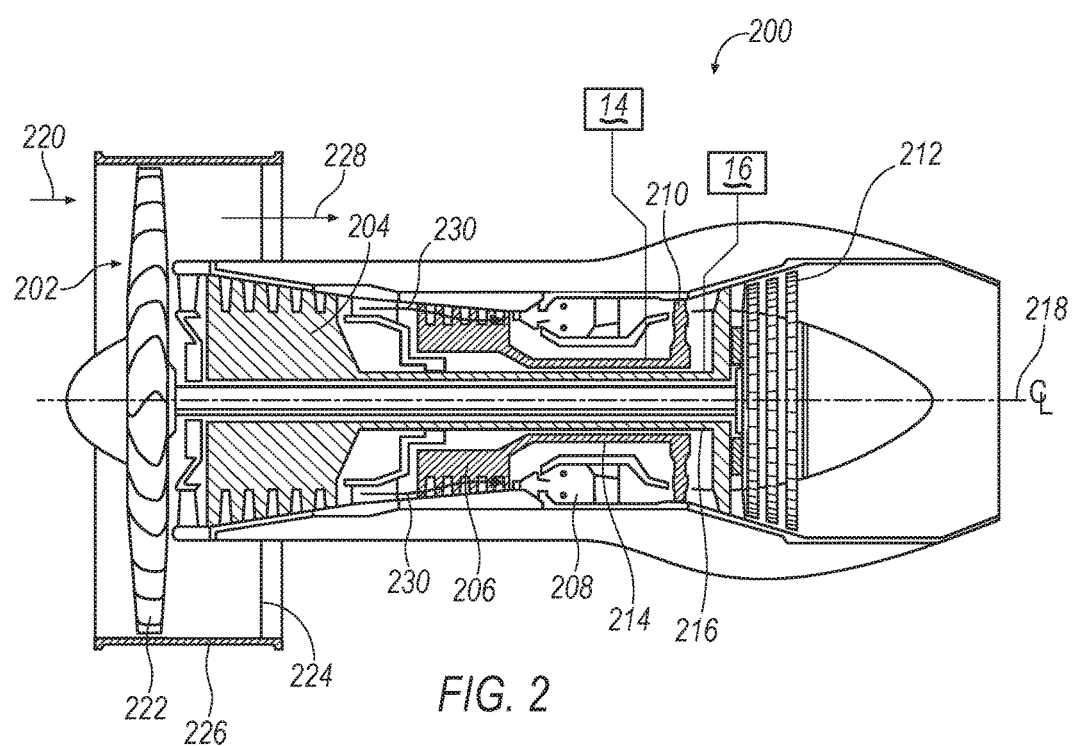
FIG. 2 illustrates an exemplary gas turbine engine that incorporates the electrical system illustrated in FIG. 1.

FIG. 2 illustrates a gas turbine engine 200, which includes a fan 202, a low pressure compressor and a high pressure compressor, 204 and 206, a combustor 208, and a high pressure turbine and low pressure turbine, 210 and 212, respectively. The high pressure compressor 206 is connected to a first rotor shaft 214 while the low pressure compressor 204 is connected to a second rotor shaft 216. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to the combustor 208 and the high pressure turbine 210.

First and second rotor shafts 214, 216, are coupled, respectively, to first and second power circuits 14, 16, as illustrated in FIG. 1. Thus, first and second power circuits 14, 16 are configured to split power between motor/generators 20, 36 so that each provides a portion of the power demand. As such, a power sharing/transfer arrangement between motor/generators 20, 36 provides the platform power demand, and includes a capability to provide power to one of the shafts 214, 216, as necessary. Such arrangement also provides an ability to optimize load shedding and a demand side management of the power requirement. Thus, life and performance considerations may be taken into account in real-time and optimized to actively seek and obtain performance optima while equipment is in operation.

Figure 3:
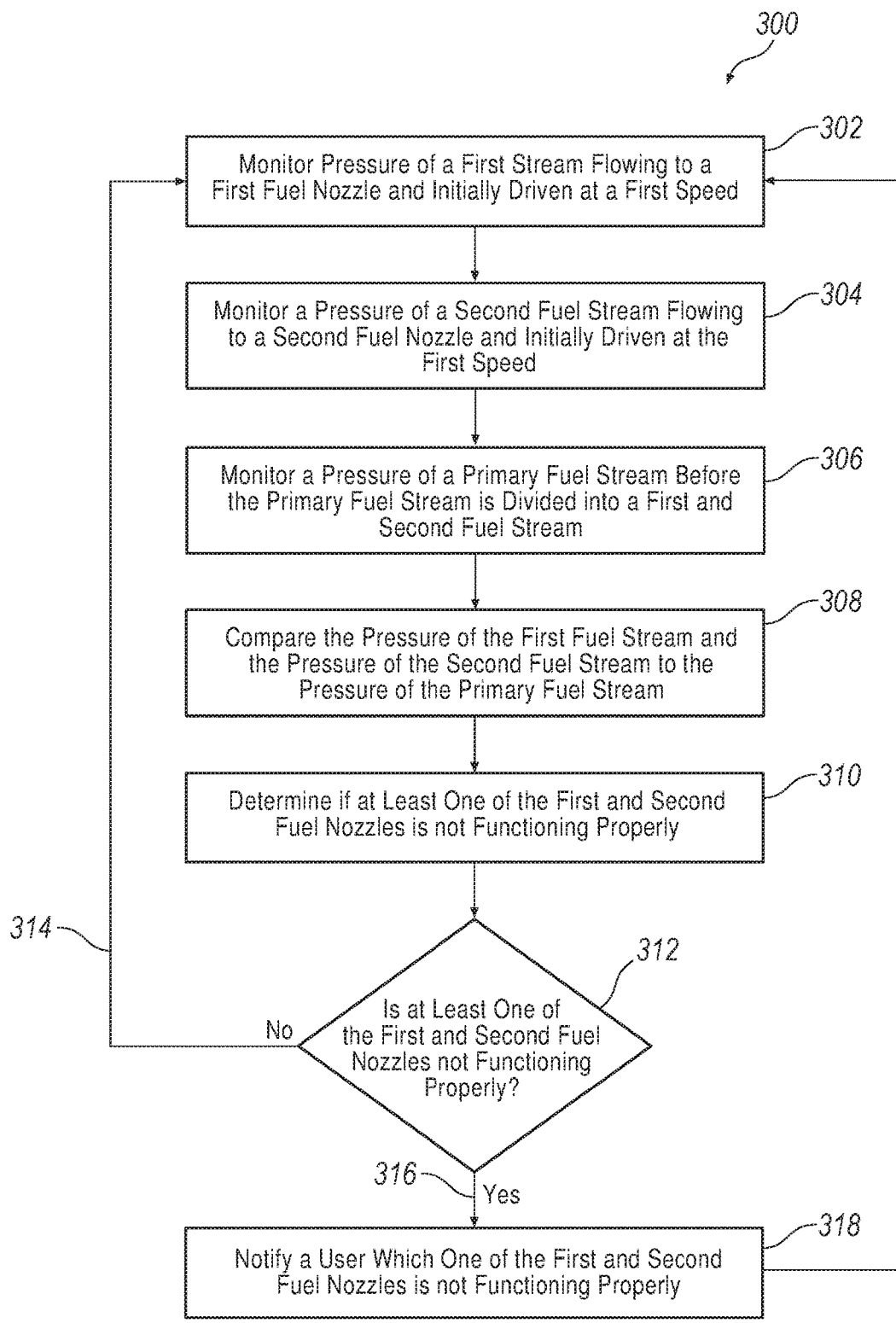
FIG. 3 depicts a flowchart illustrating a technique for monitoring the health of a gas turbine fuel system according to an embodiment.

Turning now to FIG. 3, a flowchart illustrating a technique 300 for monitoring the health of gas turbine fuel system is shown according to an embodiment. Process control begins at block 302, where pressure of a first fuel stream initially driven at a first speed and flowing to a first fuel nozzle is monitored. It is contemplated that the monitoring could be accomplished by coupling a pressure gauge to a first stream fuel line connecting the first nozzle and a first flow controller driving the fuel at the first speed. Accordingly, the fuel pressure of the first fuel stream between the first flow controller and the first nozzle is monitored. Process control then proceeds to block 304, where pressure of a second fuel stream initially driven at the first speed and flowing to a second fuel nozzle and is monitored. In a similar manner, it is contemplated that a second pressure gauge be couple to a second fuel stream line between the second nozzle and a second flow controller driving the second fuel stream.

Accordingly, the pressure of the second fuel stream between the second flow controller and the second fuel nozzle is monitored. It is contemplated that the first and second flow controllers may be two freewheeling positive-displacement pumps being driven by the same shaft so that equal speed of each can be obtained. It is envisioned, however, that other types of flow controller and other types of driving schemes may be employed.

While monitoring the first and second fuel streams at block 302 and 304, respectively, process control proceed to block 306, where a pressure of a primary fuel stream is monitored. The primary fuel stream is the fuel stream that is divided into a first and second fuel streams (more if additional flow controllers are employed). It is contemplated that the primary fuel stream be divided by a flow splitter into the first and second fuel streams. Accordingly, the monitoring of the pressure of primary fuel stream at block 306 would occur downstream from a primary fuel source and upstream from the flow splitter.

It is contemplated that the monitoring of the pressures of the primary, first, and second fuel streams at block 306, 302, 304, respectively, may occur simultaneously. Further, it is contemplated that the first and second fuel streams respectively proceed to the first and second flow controls that each drive the respective stream at the same speed.

During the monitoring of the primary, first, and second fuels streams at blocks 306, 302, and 304, process control proceeds to block 308, where the pressure of the first and second fuel streams are independently compared to the pressure of the primary fuel stream. Upon comparing the pressure at block 308, process control proceeds to block 310 where it is determined if at least one of the first and second fuel nozzles is not functioning properly.

For example, a pressure of the first fuel stream can be compared to a pressure the primary fuel stream. It will be appreciated that through the implementation of fluid dynamic techniques and by knowing the speed of the common drive along with the mechanics of the fuel lines and flow controllers, each of the first and second stream pressures should be proportional to the primary fuel stream pressure in a known manner. If either the first and/or second fuel stream pressures are not proportional in the manner(s) expected, it can be determined that one or both of the fuel nozzles is likely faulty or not functioning properly. As such, technique 300 can be employed to identify which fuel nozzle(s) is faulty.

Accordingly, process control proceeds to decision block 312 where it is determined whether or not at least one of the fuel nozzles is likely not functioning properly. If it is likely that neither 314 of the fuel nozzles are functioning improperly, process control proceeds back to block 302, where technique 300 continues.

On the other hand, it is determined at decision block 312 that at least one of the fuel nozzles is likely not 316 functioning properly, process control proceeds to block 318 where a user is notified as to which one(s) of the fuel nozzles are likely not functioning properly. The user may be, for example, a pilot, mechanic, or an engineer.

After notifying the user at block 318, process control proceeds back to block 302, where technique 300 continues.

It is noted that the example set forth in the discussion of technique 300 discuss two fuel streams with accompanying fuel controllers, fuel nozzles, and pressure determinations. Nonetheless, as will be set forth in detail below with respect to FIG. 5, it is contemplated that technique 300 of FIG. 3 can be utilized in systems that employ more than two fuel nozzles and be able to identify which of the one or more fuel nozzles is likely not functioning properly.

Technique 300 may be carried out by a controller and/or system such as the system controller and the health monitoring and prognostics system 24, each of FIG. 1. In other embodiments, however, a different controller(s) may carry out technique 300.

Figure 4:
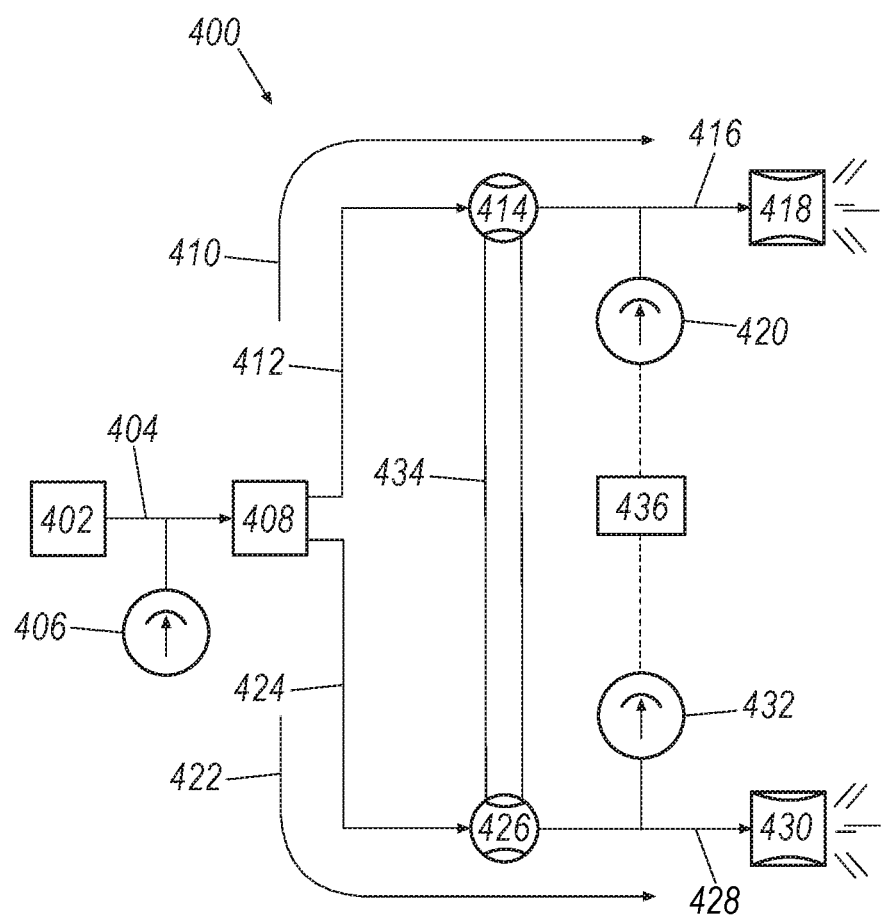
FIG. 4 illustrates a block diagram of an exemplary fuel delivery system according to an embodiment.

With reference now to FIG. 4, a block diagram of a fuel delivery system 400 for a gas turbine engine is shown according to an embodiment. The fuel delivery system 400 includes a primary fuel source 402, a primary fuel source line 404 coupled to the primary fuel source 402, a fuel source pressure sensor 406 coupled to the primary fuel source line 404, and a fuel flow splitter 408. From the fuel flow splitter 408 comes a first fuel path 410 that includes a first fuel line 412 coupled to a first fuel pump 414, a first pump outflow line 416 coupled to the first fuel pump 414 and a first fuel nozzle 418, and a first fuel pressure sensor 420 upstream from the first fuel nozzle 418 and coupled to the first pump outflow line 416.

Also from the fuel flow splitter 408 comes a second fuel path 422 that includes a second fuel line 424 coupled downstream to a second fuel pump 426, a second fuel pump outflow line 428 coupled to the second fuel pump 426 and a second fuel nozzle 430, and a second fuel pressure sensor 432 upstream from the second fuel nozzle 430 and coupled to the second pump outflow line 428.

A common drive 434 drives the fuel pumps 414, 426 at the same speed.

It is contemplated that each sensor 406, 420, 432 is coupled to a common controller 436 (shown in phantom). The fuel delivery system 400 is configured to output pressure readings from the sensors 406, 420, 432 to the common controller 436, where they are stored and/or manipulated. The common controller 436 may for example be one of the system controller of FIG. 1 or the health monitoring and prognostics controller 24, also of FIG. 1. Though, as depicted in FIG. 4, one controller is employed (i.e., the common controller 436), it is contemplated that multiple different controllers (not shown) may instead be employed.

According to an embodiment, the primary fuel source 402 provides fuel to the downstream fuel flow splitter 408, where the fuel flow splitter 408 divides the fuel into the first and second fuel lines 412, 424, respectively, in which it is respectively provided to the first and second fuel pumps 414, 426. It is contemplated that the first and second fuel pumps 414, 426, respectively, are freewheel positive-displacement pumps. However, other types of fuel pumps or flow controllers are contemplated.

The first and second fuel pumps 414, 426 are driven by the common drive 434. The common drive 434 powers each fuel pump 412, 424 to pump an equal amount of fuel. In other words, the common drive 434 ensures that each fuel pump 414, 426 outputs fuel at the same flow rate. According to an embodiment, the common drive 434 is a rotating shaft. Other types of commons drives, however, are also contemplated. For example, the common drive 434 may include a series of gears coupled together that ensure that the first fuel pump 414 and the second fuel pump 426 each output fuel at an equal flow rate.

The first fuel pressure sensor 420 is coupled to the first pump outflow line 416, which provides fuel from the first fuel pump 414 to the first fuel nozzle 418. In such a configuration, first fuel pressure sensor 420 determine our senses the fuel pressure in the first pump outflow line 416. In a similar manner, the second fuel pressure sensor 432 senses the fuel pressure in the second pump outflow line 428. The pressure readings of the first and second pressure sensors 420, 432 are provided to the common controller 436.

The fuel delivery system 400 can serve as a pressure sensing or health management system for the fuel nozzles 418, 430 that can minimize fuel nozzle variability and identify faulty fuel nozzles.

With regard to fuel nozzle variability, the common drive 434 ensures that the flow rate from the first and second pumps 414, 426 to the respective fuel nozzles 418, 430 is constant. As such, if for example, the passage size (not shown) of the first fuel nozzle 418 becomes worn, the fuel flow out of the second nozzle 430 will generally not increase. That is, since the fuel flow rate into the first and second nozzles 418, 430 is be driven by the respective fuel pumps 414, 426, the flow rate of the fuel pumps 414, 426 provide limits. In contrast to a pressure driven system that would cause more fuel to flow into and out of a worn nozzle (i.e., larger passage in the nozzle), embodiments of this disclosure can limit the amount of fuel passing through a worn nozzle. Accordingly, variability in flow rates from the fuel nozzles 418, 430 will be minimized if damage to one or more fuel nozzles 418 and/or 428 occurs.

The fuel delivery system 400 can also be employed to determine a relative health of the fuel nozzles. For example, the fuel pressure determined from the first fuel pressure sensor 420 and stored in the common controller 436 can be compared to the fuel pressure from the second fuel pressure sensor 432, also stored in the common controller 436. If the pressures are different, it is likely because one of the fuel nozzles 418, 430 are functioning improperly since the pressure should generally be the same because the fuel nozzles 418, 430 are independently being provided the same flow rate. Without more, such a technique can be used to determine the relative health of the fuel nozzle 418, 430, but not necessarily be used to determine which nozzle 418 or 430 may be faulty.

However, by employing the fuel source pressure sensor 406, the fuel delivery system 400 can be employed to identify a fuel nozzle problem with greater clarity or resolution. For example, a pressure reading from the first fuel pressure sensor 420 can be compared to a pressure reading from the fuel source pressure sensor 406. Knowing the speed of the common drive 434 along with the mechanics of the fuel lines 404, 412, 424, 428 and fuel pumps 414, 426 the pressure sensor reading from the first and second fuel pressure sensor 420, 432 should each be proportional to the reading from the fuel source pressure sensor 406 in a known manner. It will be appreciated by one skilled in the art that fluid dynamic algorithms could be employed to determine the proportional relationship(s). It is contemplated that the common controller 436 be employed to make the comparisons, determinations, and/or calculations. However, other controllers (not shown) may be employed instead.

If, for example, the pressure sensor reading from the first fuel pressure sensor 420 is not proportional to the pressure reading from the fuel source pressure sensor 406 in the manner expected, it can be determined that the first fuel nozzle 418 is likely faulty or not functioning properly. Likewise, if the pressure sensor reading from the second fuel pressure sensor 432 is not proportional to the pressure reading from the fuel source pressure sensor 406 in the manner expected, it can be determined that the second fuel pressure sensor 432 is likely faulty or not functioning properly.

If, for example, after comparing the pressure reading from the first and source pressure sensors 420, 406 respectively, the first fuel pressure sensor 420 senses a higher than the expected pressure in the first pump outflow line 416, this may be an indication that the fuel passage level in the first fuel nozzle 418 is diminished. On the other hand, upon comparing a reading from the first fuel pressure sensor 420 to a reading from the fuel source pressure sensor 406, it may be determined that he first outflow fuel line pressure is lower than expected. As such, it is likely that the passage size of the first fuel nozzle 418 is greater than expected. It will be appreciated that the same nozzle health determinations can be employed for the second fuel nozzle 430.

Accordingly, the fuel system 400 can also minimize vapor lock conditions or problems. Vapor lock occurs when the temperature of a nozzle reaches a point that causes at least some of the fuel to boil and vaporize. In turn, the vapor displaces the liquid fuel, thus vapor locking fuel away from the fuel nozzle. To compound the problem, fuel nozzles suffering from vapor lock are difficult to detect and the vapor lock can spread to other fuel nozzles causing problems often referred to as rumble and/or screech.

By employing the embodiments of this disclosure, however, vapor lock may be reversed or at least the vapor lock in a fuel nozzle may be detected. For example, if the first fuel nozzle 418 were suffering from vapor lock, the increase in pressure from the vapor displacement and the continued influx of fuel from the first fuel pump 414 may be sufficient to eliminate the vapor lock problem. At the very least, however, an increase in pressure identified from the first fuel pressure sensor 420 (or from comparing the fuel source pressure sensor 406 reading to the first fuel pressure sensor 420 reading) would indicate that the first fuel nozzle 418 is having problems which may be associated with vapor lock. Accordingly, the first fuel nozzle 418 can be replaced "on engine" without the need for further testing or the need to replace all the fuel nozzles 418, 424. Similar determinations can be made for other pressure sensors (e.g., the second fuel pressure sensor 432) employed by other embodiments of fuel delivery systems like fuel delivery system 400.

Accordingly, the fuel delivery system 400 can be employed to reduce variability in the output of the fuel nozzles 418, 430, determine a relative health between the two fuel nozzles 418, 430, and diagnose a likely problem with one or more fuel nozzles 418, 430.

Figure 5:
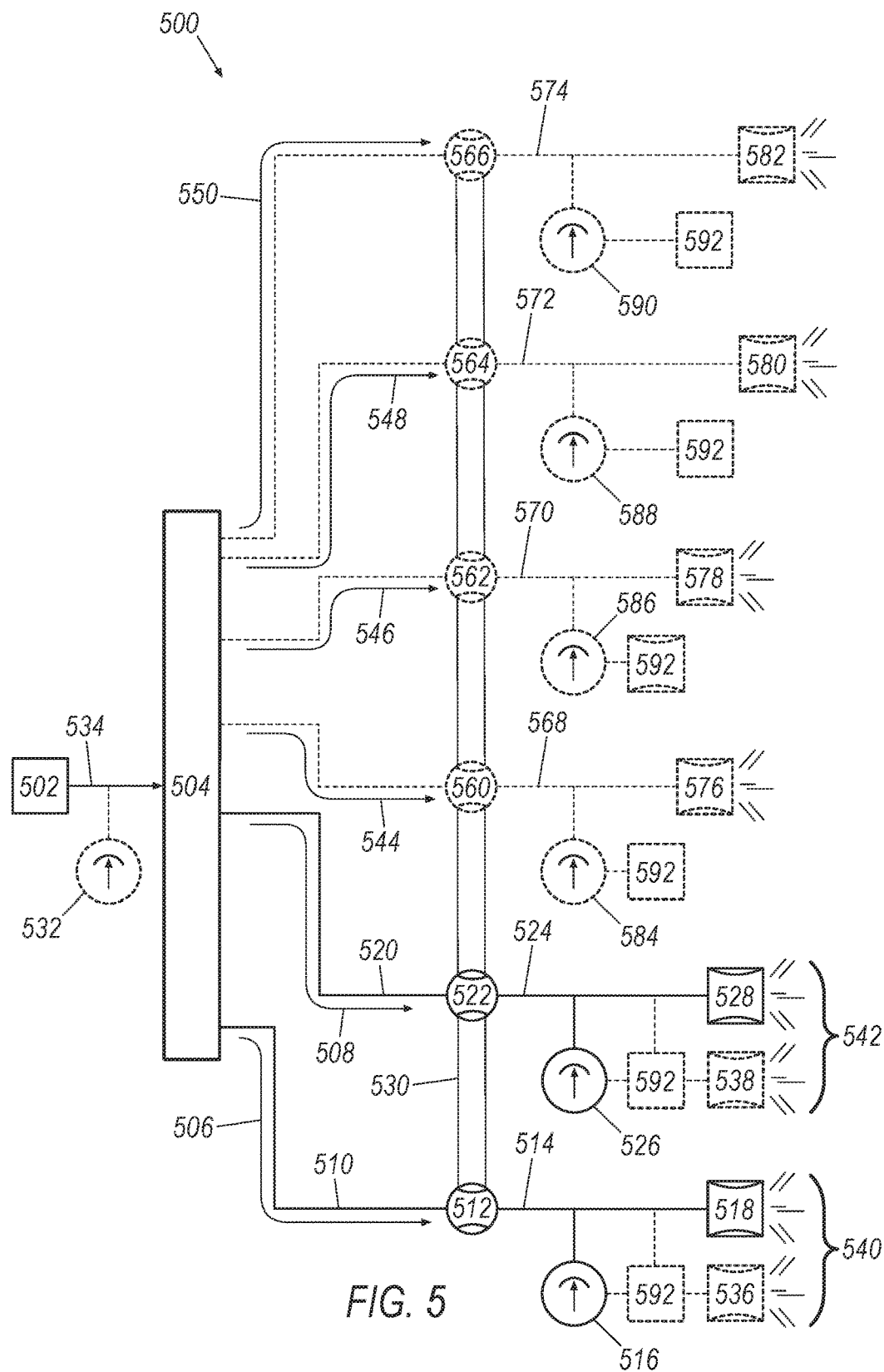
FIG. 5 illustrates a block diagram of an exemplary fuel delivery system according to another embodiment.

Referring now to FIG. 5, a block diagram of a fuel delivery system 500 is shown according to another embodiment. The fuel delivery system 500 includes a primary fuel control 502, a fuel splitter 504 that divides the fuel flow into a first flow path 506 and a second flow path 508. The first flow path 506 includes a first inlet line 510, a first fuel pump 512, a first outlet line 514, a first pressure sensor 516, and a first fuel nozzle 518. The second flow path 508 includes a second inlet line 520, second fuel pump 522, a second outlet line 524, a second pressure sensor 526, and a second fuel nozzle 528. The first and second fuel pumps 512, 522, respectively, are driven or powered by a common driver 530 such as a shaft or a plurality of gears. Since the fuel pumps 512, 522 are driven by the common driver 530, each fuel pump 512, 522 has the same, or approximately the same, fuel output rate.

According to an embodiment, the fuel delivery system 500 can be employed to determine the relative health of the first and second fuel nozzles 518, 528 by comparing the pressure reading of the first pressure sensor 516 with the pressure reading of the second pressure sensor 526. If the readings are different, it is likely that one of the first or second fuel nozzles 518 or 528 is faulty and/or not functioning properly. Further, it is contemplated that each of the pressure readings from the first and second pressure sensor 516, 526, respectively, may be compared with a pressure reading from a primary pressure sensor 532 (shown in phantom) to identify which of the two fuel nozzles 518, 528 is faulty. The primary pressure sensor is configured to determine or identify pressure readings of fuel passing through a primary fuel line 534 that couples to the fuel splitter 504. Again, as discussed above with respect to FIG. 4, it is not necessary to employ the primary pressure sensor 532 of FIG. 5 to determine that at least one of the fuel nozzles 518, 528 may be faulty and/or functioning improperly. However, by employing the primary pressure sensor 532 (and a health monitoring technique such as technique 300 of FIG. 2 and/or a technique discussed above with respect to FIG. 4), it can be determined which one of the two fuel nozzles 518, 528, FIG. 1, is likely functioning improperly.

It is contemplated that the first flow path 506 may also include an additional first fuel nozzle 536 (shown in phantom) and the second flow path 508 includes an additional second fuel nozzle 538 (shown in phantom). The first fuel nozzle 518 and the additional first fuel nozzle 536 can be viewed as a first fuel nozzle set 540. Likewise, the second fuel nozzle 528 and the additional second fuel nozzle 538 can be viewed as a second fuel nozzle set 542. The first and second pressure sensors 516, 526 can be employed to determine the relative health of the group of the four fuel nozzles 518, 528, 536, 538.

Further, however, the primary pressure sensor 532 can also be employed to determine which of the fuel nozzle sets 540, 542 likely include at least one faulty fuel nozzle. Since, as will be appreciated, the relationship between the pressure reading of the primary pressure sensor 532 and the pressure reading of the first pressure sensor 516 can be known, if the relationship is violated it is likely that at least one of the fuel nozzles of the first fuel nozzles 518, 536 of the first fuel nozzle set 540 is not functioning improperly. For example, if the pressure reading from the first pressure sensor 516 is lower than expected from the primary pressure sensor 532, it is likely at least the first and/or additional first fuel nozzle 518, 536 has a fuel passage (not shown) larger than expected. The same technique can be employed to determine if the second fuel nozzle set 542 contains at least one faulty nozzle.

According to an embodiment where additional fuel nozzles (e.g., additional fuel nozzles 536, 538) are employed, individual faulty fuel nozzles are not identified. However, a fuel nozzle set (e.g., first and second fuel nozzle sets 540, 542) likely containing at least one faulty fuel nozzle can be identified. As such, maintenance can be done on only one set (e.g., first or second fuel nozzle sets 540, 542) instead of both fuel nozzle sets to identify the faulty fuel nozzle(s).

Though, according to an embodiment, the first flow path 506 includes two fuel nozzles 518, 536, embodiments are envisioned where a fuel path such as the first flow path 506 includes more than two fuel nozzles.

It is also contemplated that according to another embodiment, the fuel delivery system 500 includes one or more fuel paths other than the first and second fuel paths 506, 508. For example, the fuel delivery system 500 may include an additional plurality of fuel paths 544, 546, 548, 550. These fuel paths 544-550 would also include a plurality of inlet lines 552, 554, 556, 558 (shown in phantom), a plurality of fuel pumps 560, 562, 564, 566 (shown in phantom) driven by the common driver 530 (partially shown in phantom), a plurality of outlet lines 568, 570, 572, 574 (shown in phantom), and a plurality of fuel nozzles 576, 578, 580, 582 (shown in phantom). As with the first and second fuel paths 506, 508, the additional plurality of fuel paths 544-550 would also include respective pressure sensors 584, 586, 588, 590 (shown in phantom). Further, the pressure sensors 584-590 would be coupled to a common controller 592 or computing device where the pressure reading are stored and manipulated. As such, the readings of the nozzle pressure sensors 516, 526, 584-590 can be employed to determine the relative health of the fuel nozzles 518, 528, 536, 538, 576-582. If, however, a primary pressure sensor such as the primary pressure sensor 532 is also employed, the faulty fuel nozzle(s) can be identified with a finer degree of resolution.

It is noted that, though not shown, that the fuel paths 544-550, may each employ more than the one fuel nozzle shown (i.e., fuel nozzles 576-582). In other words, each fuel path 544-550 may employ additional fuel nozzles (not shown) similar to fuel path 506 and 508.

The embodiments of the disclosure enable the identification of a general or relative health of a fuel delivery system (e.g., fuel delivery system 400 of FIG. 3 and fuel delivery system 500 of FIG. 4). Further, embodiments of the disclosure can also be employed to identify which fuel nozzles are likely not functioning improperly or at least identify a subset of fuel nozzles that may be not be functioning improperly.

Computing devices such as system 10 of FIG. 1 generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A gas turbine health monitoring fuel system comprising:
a fuel splitter;
a first fuel pump downstream from the fuel splitter;
a first fuel nozzle fluidly coupled to the first fuel pump by a first fuel stream;
a second fuel pump downstream from the fuel splitter;
a second fuel nozzle fluidly coupled to the second fuel pump by a second fuel stream; a common drive coupled to the first and second fuel pumps and configured to drive the first and second fuel pumps at a same speed;
a controller system configured to:
identify a first fuel pressure in the first fuel stream;

identify a second fuel pressure in the second fuel stream; and
determine a difference between the first and second fuel pressures to diagnose if at least one of the fuel nozzles is faulty; and
a primary fuel source configured to supply a primary fuel stream to the fuel splitter,
wherein the controller system is further configured to:
identify a primary fuel pressure in the primary fuel stream;
compare the first fuel pressure to the primary fuel pressure;
compare the second fuel pressure to the primary fuel pressure;
identify a difference between at least one of the first and second fuel pressures and the primary fuel pressure; and
notify a user that at least one of the fuel nozzles is faulty.

2. The gas turbine health monitoring fuel system of claim 1, wherein the common drive is a rotatable shaft of a positive-displacement fuel pump system comprising the first and second fuel pumps.

3. The gas turbine health monitoring fuel system of claim 1, wherein the common drive comprises a plurality of gears.

4. The gas turbine health monitoring fuel system of claim 1, further comprising:
an additional first fuel nozzle fluidly coupled to the first fuel pump by the first fuel stream; and
an additional second fuel nozzle fluidly coupled to the second fuel pump by the second fuel stream.

5. The gas turbine health monitoring fuel system of claim 1, the controller system further configured to:
determine if at least one fuel nozzle of the first and second fuel nozzles is improperly functioning based on the identified difference between the at least one of the first and second fuel pressures and the primary fuel pressure; and
notify a user that the at least one fuel nozzle is improperly functioning.

6. The gas turbine health monitoring fuel system of claim 5, the controller system further configured to identify a vapor lock condition in the gas turbine fuel system.

7. A fuel pressure sensing system for a gas turbine engine comprising:
a first fuel splitter configured to split a primary fuel stream into a first and second stream;
a first and second flow controller, wherein the first flow controller is configured to move the first stream at a first flow rate and the second flow controller is configured to move the second stream at the first flow rate;
a first and second fuel nozzle respectively downstream from the respective first and second flow controllers;
a first pressure sensor positioned downstream from the first flow controller and upstream from the first fuel nozzle, wherein the first pressure sensor is configured to sense a first fuel stream pressure between the first flow controller and the first fuel nozzle;
a second pressure sensor positioned downstream from the second flow controller and upstream from the second fuel nozzle, wherein the second pressure sensor is configured to sense a second fuel stream pressure between the second flow controller and the second fuel nozzle;
a primary fuel source configured to supply a primary fuel stream to the fuel splitter; and
a controller system configured to:

identify a primary fuel pressure in the primary fuel stream;
compare the first fuel pressure to the primary fuel pressure;
compare the second fuel pressure to the primary fuel pressure; and
identify a difference between at least one of the first and second fuel pressures and the primary fuel pressure; and at least one of:
a common rotatable shaft coupled to the first and second flow controllers and configured to drive the first and second flow controllers at a same speed; and
at least one gear coupled to the first and second flow controllers configured to drive the first and second flow controllers at the same speed; and
notify a user that at least one of the fuel nozzles is faulty.

8. The fuel pressure sensing system of claim 7, wherein the controller is further configured to determine if the first fuel stream pressure is different than the second fuel stream pressure.

9. The fuel pressure sensing system of claim 8, wherein the fuel pressure sensing system is configured to remove a vapor lock condition from one of the first and second fuel nozzles.

10. The fuel pressure sensing system of claim 7, further comprising:
a primary flow controller configured to supply the flow splitter with the primary fuel stream; and
a pressure sensor downstream from the primary flow controller and upstream from the flow splitter and configured to sense a primary fuel stream pressure of the primary fuel stream supplied to the flow splitter.

11. The fuel pressure sensing system of claim 10, further comprising a controller configured to:
identify a difference between the first fuel stream pressure and the primary fuel stream pressure; and
notify a user that the first fuel nozzle is faulty.

12. The fuel pressure sensing system of claim 11, wherein the first and second flow controllers are respectively a first and second positive displacement pump driven at a same speed.

13. A method of determining fuel nozzle health using the gas turbine health monitoring fuel system of claim 1 comprising:
monitoring the primary fuel pressure of the primary fuel stream before the primary fuel stream is divided into the first and second fuel stream;
monitoring the first fuel pressure of the first fuel stream initially driven at a first speed, wherein the first fuel stream is initially driven at the first speed to supply the first fuel nozzle;
monitoring the second fuel pressure of the second fuel stream initially driven at the first speed, wherein the second fuel stream is initially driven at the first speed to supply the second fuel nozzle;
comparing the pressure of the first fuel stream and the pressure of the second fuel stream to the pressure of the primary fuel stream;
identifying which of the first and second fuel nozzles is functioning improperly based on the comparing the pressure of the first fuel stream and the pressure of the second fuel stream to the pressure of the primary fuel stream; and
notifying a user that at least one of the fuel nozzles is faulty.

14. The method of claim 13, further comprising notifying a user which of the first and second fuel nozzles is functioning improperly based on the identifying which of the first and second fuel nozzles is functioning improperly.

15. The method of claim 13, further comprising comparing the first fuel pressure of the first fuel stream to the second fuel pressure of the second fuel stream to determine if at least one of the first and second fuel nozzles is functioning improperly.

16. The method of claim 13, further comprising:
   driving a first fuel stream flow controller at the first speed; and
   driving a second fuel stream flow controller at the first speed, wherein the first fuel stream flow controller is coupled to the second fuel stream flow controller.

17. The method of claim 16, further comprising identifying a vapor lock condition in a fuel system based on the comparing the first fuel pressure of the first fuel stream to the primary fuel pressure of the primary fuel stream.

* * * * *